(12) United States Patent
Pohn et al.

(10) Patent No.: US 7,448,595 B2
(45) Date of Patent: Nov. 11, 2008

(54) SHUT-OFF FITTING

(75) Inventors: Franz Johann Pohn, Vöcklabruck (AT); Rupert Schlagnitweit, Puchkirchen am Trattberg (AT); Christian Berger, Lambach (AT); Gerhard Führer, Pfaffing (AT)

(73) Assignee: E. Hawle Armaturenwerke GmbH, Vöcklabruck (AT)

( * ) Notice: Subject to any disclaimer, the term of this patent is extended or adjusted under 35 U.S.C. 154(b) by 512 days.

(21) Appl. No.: 10/519,288

(22) PCT Filed: Jun. 4, 2003

(86) PCT No.: PCT/AT03/00163

§ 371 (c)(1),
(2), (4) Date: Aug. 23, 2005

(87) PCT Pub. No.: WO2004/003413

PCT Pub. Date: Jan. 8, 2004

(65) Prior Publication Data

US 2006/0097215 A1     May 11, 2006

(30) Foreign Application Priority Data

Jun. 27, 2002    (AT)   ................................ A 966/2002

(51) Int. Cl.
*F16K 3/00*        (2006.01)

(52) U.S. Cl. .................... 251/327; 251/328; 251/329

(58) Field of Classification Search ................. 251/326, 251/327, 328, 329
See application file for complete search history.

(56) References Cited

U.S. PATENT DOCUMENTS 729,181 A * 5/1903 Jacobsen .................... 251/327

(Continued)

FOREIGN PATENT DOCUMENTS

CH           624197          12/1977

(Continued)

OTHER PUBLICATIONS

International Search Report.

(Continued)

*Primary Examiner*—John Bastianelli
(74) *Attorney, Agent, or Firm*—Collard & Roe, P.C.

(57) ABSTRACT

A shut-off instrument for a flow medium, in particular a slide valve instrument designed for pressurization on both sides with an instrument housing forming a flow channel and a slide valve chamber and with a soft-sealing shut-off element closing off the flow channel and with a slide valve stem which penetrates a seal arrangement and/or bearing arrangement in a housing neck extension delimiting the slide valve chamber and which is rotationally connected to a stem nut coupled to the shut-off element by a screw contact. The shut-of element is designed to include more than one part and at least one external dimension of the main body is slightly smaller than a nominal width of the flow channel and seal elements are arranged on opposite support surfaces of the main body via an engaged connection projecting over the external dimension with a peripheral edge collar.

51 Claims, 10 Drawing Sheets

U.S. PATENT DOCUMENTS

| | | | | |
|---|---|---|---|---|
| 2,868,495 | A | * | 1/1959 | Lucas ......................... 251/328 |
| 3,215,399 | A | * | 11/1965 | McInerney et al. .......... 251/327 |
| 5,085,403 | A | * | 2/1992 | Dierikx ....................... 251/327 |
| 5,396,919 | A | * | 3/1995 | Wilson ........................ 251/327 |
| 6,845,783 | B1 | * | 1/2005 | Sheppard ..................... 251/327 |

FOREIGN PATENT DOCUMENTS

| | | |
|---|---|---|
| DE | 527748 | 9/1931 |
| DE | 1093634 | 11/1960 |
| DE | 1916347 | 10/1969 |
| DE | 2020829 | 4/1970 |
| DE | 2942091 | 10/1979 |
| DE | 3302979 | 1/1983 |
| EP | 0445020 | 5/1994 |
| FR | 83972 | 11/1964 |
| GB | 2149065 | 6/1985 |

OTHER PUBLICATIONS

International Preliminary Examination Report.

* cited by examiner

SHUT-OFF FITTING

CROSS REFERENCE TO RELATED APPLICATIONS

Applicants claim priority under 35 U.S.C. §119 of Austrian Application No. A 966/2002 filed Jun. 27, 2002. Applicants also claim priority under 35 U.S.C. §365 of PCT/AT03/00163 filed on Jun. 4, 2003. The international application under PCT article 21(2) was not published in English.

BACKGROUND OF THE INVENTION

1. Field of the Invention

The invention relates to a shut-off instrument for a flow medium.

2. Description of the Related Art

From the document DE 1 093 634 a shut-off valve is known with a shutting-off element comprising a carrier and a casing made of elastic material. The shutting-off element encased with elastic material is in the form of a hollow cylinder that is closed on one side in the form of a spherical indentation, which cylinder is provided on its outer surface with the casing made of elastic material, and is adjustable from a position of blocking the flow channel of a valve housing into a position of opening the flow channel. This performed by means of a threaded stem mounted rotatably and sealingly in a neck extension of the valve housing, the thread of which engages with an internal thread in the shutting-off element. The elastic casing forms, together with diametrically opposite guide tracks and guide grooves receiving the latter in the housing in a plane perpendicular to the flow direction, a linear guide for the positioning of the shutting-off element so that the latter cannot rotate and is supported against the pressure of the medium. The stem bearing in the neck extension makes a pendulum movement of the adjusting stem possible by means of an elastic bearing and sealing element to obtain a sealed bearing on sealing surfaces surrounding the flow channel.

From a further document DE 527 748 a sealing device is known for a sealing body of a stopcock or valve or slide valve, in which the sealing body comprises a hollow cylindrical main body closed at one end and, which is provided on the cylindrical outer surface with a casing made of elastic material for sealing arrangement in a housing shaping of a valve housing forming the flow channel. The adjustment of the sealing body is performed by an adjusting stem in a vertical direction determined by the flow direction in the flow channel, whereby the sealing body is provided with diametrically opposite guide wings which engage in linear guide grooves of a neck extension, and thus there is no risk of twisting and guiding. In order to avoid deformations to the hollow cylindrical sealing body caused by the pressure of the medium, bores traversing the casing and walls of the sealing element are provided which equalize the pressure.

A method for producing a shut-off instrument and a shut-off element are known from DE 19 16 347 A1, which comprises a one piece element housing with a housing part forming a flow channel and a housing extension which forms a slide valve chamber for a wedge-type valve and a stem bushing with sealing arrangement and is joined in one piece to the housing part, for completely mounting a shut-off element designed with the slide valve stem-movable as a wedge-type valve, which is guided in the element housing in such a way that it cannot be twisted. The design relates to a so-called hard sealing slide valve instrument and sealing elements forming sealing surfaces opposite the flow channel are arranged; to which diametrically opposed sealing faces on the wedge-type valve are allocated. In order to manufacture a one piece housing for a shut-off instrument of this kind an expensive mould structure and moulding procedure is necessary, in order to position the premanufactured wedge-type valve into a mould core and position it with the latter in a casting mould.

Furthermore, a shut-off instrument with a housing that is essentially in one piece is also known from DE 33 02 979 A1, which is provided with a lateral assembly opening for inserting the shut-off instrument and the bearing arrangement, and which can be sealed with a housing lid. In order to achieve the required tightness, in particular at higher nominal pressures, it is necessary to shape the housing and the housing lid on the sealing surfaces and design the securing of the housing lid in a particular way.

SUMMARY OF THE INVENTION

The objective of the invention is to create a shut-off instrument regardless of the design as a one-piece or multipart housing, by means of the entire range of occurring pressure can be controlled, and due to the simple installation of elements of the instrument made from materials adapted to the properties of the medium to be controlled; the shut-off instrument can be used universally.

The objective of the invention is achieved by a shut-off instrument wherein the shut-off element includes multiple parts and at least one external dimension of the main body is slightly smaller than a nominal width of the flow channel and seal elements are arranged on opposite support surfaces of the main body via an engaged connection projecting over the external dimension with a peripheral edge collar. The advantage of the design according to the invention is that the components forming the shut-off element, comprising a main body, sealing elements and if required support and securing means, are inserted through the flow channel in operative position into the instrument housing, the main body can be coupled with the stem nut and the shut-off element can be completed in assembly stages, without expensive assembly aids being necessary.

In another embodiment, sealing surfaces are arranged in the housing neck extension, which mount the sealing and/or bearing arrangement and are concentric to a longitudinal muddle axis of the slide valve stem, which seal surfaces widen conically from a base of the housing neck extension in the direction of an end face of the housing neck extension. This embodiment is also advantageous however, because thereby the instrument housing is manufactured in such a way that the components for the seal and bearing arrangement can be assembled in the region of the slide valve stem bushing without remachining.

In another embodiment, the instrument housing is in one piece with the housing neck extension. This embodiment is advantageous, as thereby the bearing of the prefabricated components needed for the final assembly is simplified due to the low number of parts, and due to the short assembly time the instrument can be assembled only to fulfil the orders actually received.

In another embodiment, the instrument housing includes multiple parts with the housing neck extension. This embodiment is also advantageous, as thereby simplified production methods can be applied for manufacturing the instrument housing.

According to further embodiments it is possible to provide in each case a housing division suitable for a specific purpose of the shut-off instrument.

In another embodiment, the housing parts of the instrument housing are detachably connected by a flange arrangement formed in a region of a division plane. According to this embodiment the housing parts of multi-part housings can be sufficiently and reliably joined together even for high-pressure ranges.

According to further embodiments a torque applied by the adjustment of the shut-off element by the slide valve stem is taken up by the guides of the stem nuts, and thereby the shut-off element, in particular the sealing elements of the shut-off element, is protected effectively from asymmetrical loading and thereby uneven wear and damage.

According to further embodiments, a simple coupling procedure is achieved for producing the moving connection between the stem nut and the main body of the shut-off element during assembly, in particular in a design of the shut-off element with a one-piece instrument housing.

In another embodiment, the main body is in the shape of a disc and in the direction of an external dimension is penetrated by a mounting bore receiving the slide valve stem. According to this embodiment, a component that is simple to manufacture is obtained for the main body of the shut-off element.

In further embodiments particularly for greater nominal widths, such as for example over 100 mm, the structure of the shut-off element is simplified and the assembly within a one-piece housing is facilitated.

In further embodiments, the pressure acting on the shut-off element is absorbed by the medium in the guiding arrangement and kept apart from the slide valve stem and the smooth adjustment of the shut-off element is ensured. The arrangement of guide elements in the main body, which project over the external dimensions of the latter in the region of the middle axis, is particularly advantageous, because thereby there is a symmetrical removal of pressure into the guiding arrangement.

A one-piece structure of the main body with the guiding elements is however also possible, because in this way the assembly is simplified.

In another embodiment, the seal elements are connected with the support discs and the guide elements preferably by securing means, e.g. a spacer screw, arranged in a main body middle plane running perpendicular to the longitudinal middle axis. This embodiment is advantageous because thereby the completion of the shut-off element is simplified by assembly of the sealing elements in the coupled state of the main body with the stem nut, i.e. in the region of the instrument housing.

According to further embodiments the leakage of medium through the shut-off element is effectively prevented in the shut position.

In further embodiments, a reliable and easily assembled sealing arrangement is achieved in the region of the slide valve stem bushing even at the highest pressures.

In a further embodiment, the bayonet locking device of the seal carrier in the housing neck extension is formed by locking elements projecting diametrically over an external diameter of the seal carrier and mounting grooves allocated to the locking elements in a mounting bore of the housing neck extension. In this embodiment, additional securing elements can be dispensed with and assembly is simplified.

In a further embodiment, the seal carrier in the housing neck extension is prevented from twisting by at least one flanged nose. This embodiment prevents rotation and thereby prevents the unintentional detachment of the seal carrier from the housing neck extension.

According to further embodiments, a particularly smooth bearing of the slide valve stem taking up radial and axial loads is achieved, whereby the smoothness of the adjustment is ensured.

In a further embodiment, bearing means of the bearing arrangement for the slide valve stem are formed by a bearing layer applied to bearing points in the housing neck extension. Thereby, the bearing elements can be dispensed with, e.g. by sealing a bearing gap with a hardening plastic composition suitable for bearing purposes.

In another embodiment, a neck ring is arranged at the end section of the housing neck extension enclosing the stem projection, which is secured in the housing neck extension and penetrated by the stem projection. According to this embodiment a reliable, sealing housing neck seal is achieved, which is simple to assemble and disassemble, whereby the maintenance work and replacement of the seals or bearing elements are simplified.

According to further embodiments, a versatile shut-off instrument is made possible by using a combination of various different materials for the individual elements of the shut-off instrument and the instrument housing, whereby the shut-off instrument can be used in low pressure conditions up to high pressure conditions, and for media of all kinds including highly aggressive media and within a broad temperature range.

In another embodiment, the locking position of the shut-off element, in which the seal elements lie against the sealing surfaces of the instrument housing, is formed by a stop arrangement between the slide valve stem and the main body of the shut-off element, in particular by a detent ring secured to the end section of the slide valve stem, which delimits the movement of the threaded stem. This embodiment ensures pressure equalisation and a reliable seal by preventing excess pressure on the seal elements to obtain even pressure on the sealing surfaces, whereby premature wear or damage to the seal elements is effectively prevented.

In another embodiment, the edge collar of the sealing element has sealing lips. In this embodiment, a multiple sealing effect and greater elasticity of the seal elements are achieved in the bearing region, and thereby fewer elastic materials need to be used, which are advantageous for many purposes, and a greater service life can be obtained.

BRIEF DESCRIPTION OF THE DRAWINGS

For a better understanding of the invention the latter is explained in more detail by way of the embodiments illustrated in the figures. Of these.

DETAILED DESCRIPTION OF PREFERRED EMBODIMENTS

Firstly, it should be noted that in the variously described embodiments the same parts are allocated with the same reference numbers or the same component names, whereby the disclosures contained throughout the description can be applied analogously to the same parts with the same reference numbers or the same component names. In addition, the details relating to position such as e.g. top, bottom, side etc. relate to the Figure actually being described and when there is a change in position should be transposed to the new position. Furthermore, individual features or combinations of features from the shown and described various embodiments can in themselves represent independent, inventive solutions according to the invention.

Figure 1:
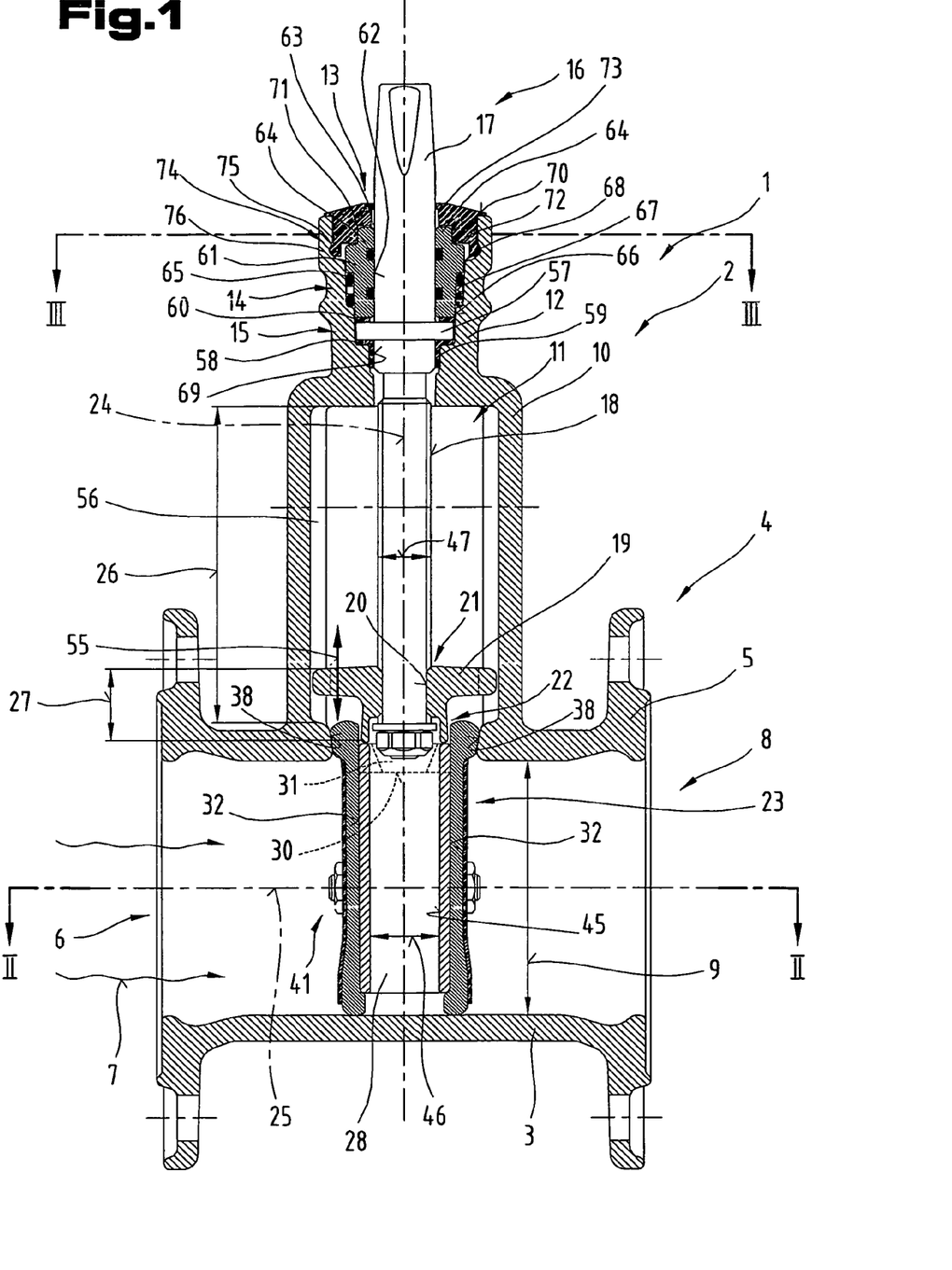
FIG. 1 shows a shut-off instrument in cross section along the line I-I of FIG. 2.
Figure 2:
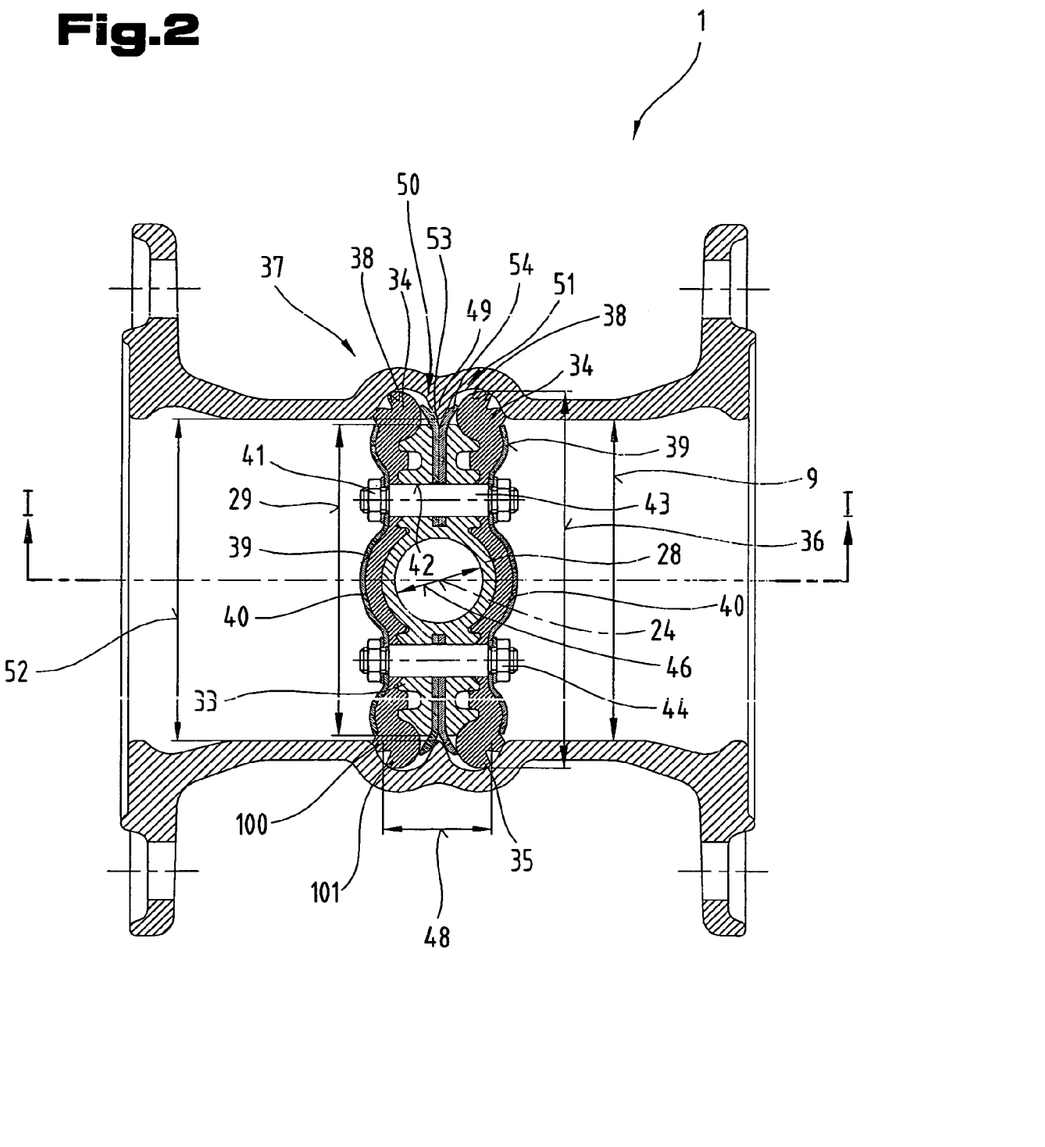
FIG. 2 shows the shut-off instrument, in cross section along the line II-II of FIG. 1.

In FIGS. 1 and 2 a shut-off instrument 1, in particular a slide valve instrument 2 is shown. The latter comprises an instrument housing 3 which surrounds a flow channel 6 for a medium—arrow 7—between spaced apart connection elements 4, in the shown embodiment connection flanges 5. The flow cross section 8 is a nominal width 9 of the flow channel 6. Furthermore, the instrument housing 3 with a housing projection 10 forms a slide valve chamber 11 and in an adjoining housing neck extension 12 forms a stem bushing 13 with a seal arrangement 14 and a bearing arrangement 15 for a slide valve stem 16. The slide valve stem 16 projects with a stem projection 17 through the housing neck extension 12 into the slide valve chamber 11 and in the region of the slide valve chamber 11 comprises an external thread 18 with which a stem nut 19 with an internal thread 21 arranged inside a bore 20 is engaged. The stem nut 19 is detachably connected via a detachable coupling arrangement 22 to a shut-off element 23.

A longitudinal middle axis 24 of the housing projection 10, housing neck extension 12 and the slide valve stem 16 is perpendicular to a middle axis 25 of the flow channel 6.

The slide valve chamber 11 formed by the housing projection 10 has a length 26 in the direction of a longitudinal extension which is designed for the complete clearance of the flow cross section 8 by the shut-off element 23, and corresponds roughly to the nominal width 9 in addition to the height 27 of the stem nut 19.

The shut-off element 23 is in the form of a disc-shaped main body 28 with an external dimension 29 which is slightly less than the nominal width 9. Facing the stem nut 19 the main body 28 comprises coupling grooves 30 for the engagement of hoe-like coupling means 31 of the stem nut 19, whereby the detachable coupling arrangement 22 is formed between the stem nut 19 and the main body 28 of the shut-off element 23.

Opposite bearing surfaces 32 of the main body 28 have a structure in the form of ribs 33 and on said bearing surfaces 32, disc-like so-called soft sealing elements 34 are arranged with a compatibly designed structure, to form an interlocking arrangement. Said sealing elements 34 have a circumferential edge collar 35, whereby the external dimension 36 is greater than the nominal width 9, and are provided for the sealing arrangement on opposite sealing surfaces 38 formed by a housing shaping 37.

In order to support the sealing elements 34 and secure them to the main body 28 support discs 40 arranged on opposite end faces 39 of the seal elements 34 are provided, which are secured by securing means 41, e.g. thread bolts 43 and thread nuts 44 traversing the main body 28, the sealing elements 34 and the support sheets 40 in bores 42.

It should also be mentioned that the main body 28 concentric to the longitudinal middle axis 24 is provided with a mounting bore 45 extending over the entire diameter 29 for feeding through the slide valve stem 16, whereby the internal diameter 46 is slightly greater than the thread external diameter 47 of the slide valve stem 16.

The flow channel is designed to have preferably a circular flow cross section 8 and on both sides of the shut-off element 23 flow channel sections are in alignment with one another and have an even flow cross section 8. In a design of this kind the nominal width 9 corresponds to a nominal diameter of the flow channel 6 and the external dimension 29 of the main body 28 corresponds to an external diameter.

The flow channel 6 can also have a different geometric shape, such as for example an oval or elliptical shape.

According to the invention it is essential for the external dimension 29 of the main body 28, with the round shape diameter, to be slightly smaller than the nominal width 9 corresponding to a nominal diameter of the flow channel 6.

With an oval or elliptical shape it is essential according to the invention to make the smallest external dimension 29 of the main body slightly smaller than the minimal size of the nominal width 9 of the flow cross section 8.

Said allowances considerably simplify the insertion of the main body 28, coupling with the stem nut 19 and assembly of the seal elements 34 in a one-piece instrument housing 3, whereby assembly aids can be dispensed with and assembly time is saved.

In the region of the opposite housing shapings 37 in the centre of a middle distance 48 between the sealing surfaces 38, guide webs 49 projecting in the direction of the main body 28 are formed with a roughly triangular cross section, which run up to the region of the slide valve chamber 11, which cooperate with guide elements 50 fixed in the main body 28 and projecting over its diameter 29 in the direction of the guide webs 49, whereby a linear guide arrangement 51 is obtained as well as means for preventing the twisting of the stop element 23. A clear space 52 between the guide webs 49 is equal to or slightly greater than the nominal width 9. The guide elements 50 are arranged for example in slot-shaped recesses 53 of the main body 28 and fixed in the recess 53 by securing means 41 traversing the main body 28. Preferably, the guide elements 50 are formed by pairs of guide sheets 54, which are angled in the projecting section, which surround the guide webs 49 in a V-shape.

The shut-off element 23 is activated, as already described above, by means of the stem nut 19 coupled by the coupling arrangement 22 to the shut-off element 23, the stem nut engaging with the external tread 18 of the slide valve stem 16. Furthermore, the stem nut 19 is guided adjustably unable to be twisted in the slide valve chamber 11 in the direction of movement according to double arrow 55. In addition, guides 56 are arranged in the housing projection 10 which are diametrically opposite in relation to the longitudinal middle axis 24 and run parallel to the longitudinal middle axis 24, in which guides the guide extensions of the stem nut 19 engage. In this way a linear movement of the stem nut 19 and thereby the shut-off element 23 is achieved on the basis of a rotational movement of the slide valve stem 16 rotatably mounted in the housing neck extension 12.

In the housing neck extension 12 in the bearing arrangement 15 the slide valve stem 16 is rotatably mounted by a peripheral bearing collar 57 in a bearing sleeve 59 arranged in the housing neck top 12 and provided with a bearing flange 58. On the upper side of the bearing collar 57 opposite the bearing flange 58 a further face seal ring 60 is arranged, which is positioned against the bearing collar 57 by means of a seal carrier 61 inserted in the housing neck extension 12 into the stem bushing 13 and surrounding the stem projection 17. This design of the bearing arrangement 15 ensures the play-free, radial and axial bearing of the slide valve stem 16 in the housing neck extension 12.

The seal carrier 61 comprises an O-ring 64 in a bore 32 for the stem projection 17 in at least one peripheral groove 63, whereby preferably a further O-ring is arranged in a groove spaced further apart to decrease the likelihood of leakage. Furthermore, the seal arrangement 14 comprises a seal to prevent the leakage of the medium at a certain pressure level, which is preferably in the form of a pair of O-rings 65 arranged between an external circumference 66 of the seal carrier 61 and a mounting bore 67 of the housing neck extension 12. A bearing bore 69 facing the seal carrier 61 mounting the inner surface 68 of the mounting bore 67 as well as the bearing sleeve 59 runs from an end face 70 of the housing neck extension 12 in the direction of the slide valve chamber 11 corresponding to a surface of a conical casing, the lines of which run together in the direction of the slide valve chamber 11. The seal carrier 61 is also designed to have a truncated-cone shaped surface at least in the region of a seal projection. In this way with a one-piece design of the instrument housing 3 a cast design with the lowest manufacturing tolerances is achieved, by means of which subsequent, expensive manufacturing procedures, such as e.g. a metal-removing rotatory procedure in the region of the stem bushing 13 becomes unnecessary, which results in considerable economic savings, and also means that the parts are of the highest quality in terms of seal tightness and replaceability.

For the axial securing of the seal carrier 61 a neck ring 73 is provided surrounding the stem projection 17 in an annular recess 71 of the housing neck extension 12 and the seal carrier 61 with support surfaces 72, which neck ring is locked e.g. by a locking arrangement 74 formed by hoe-shaped spring arms 75 in locking mounts 76 of the housing neck extension 12.

Figure 3:
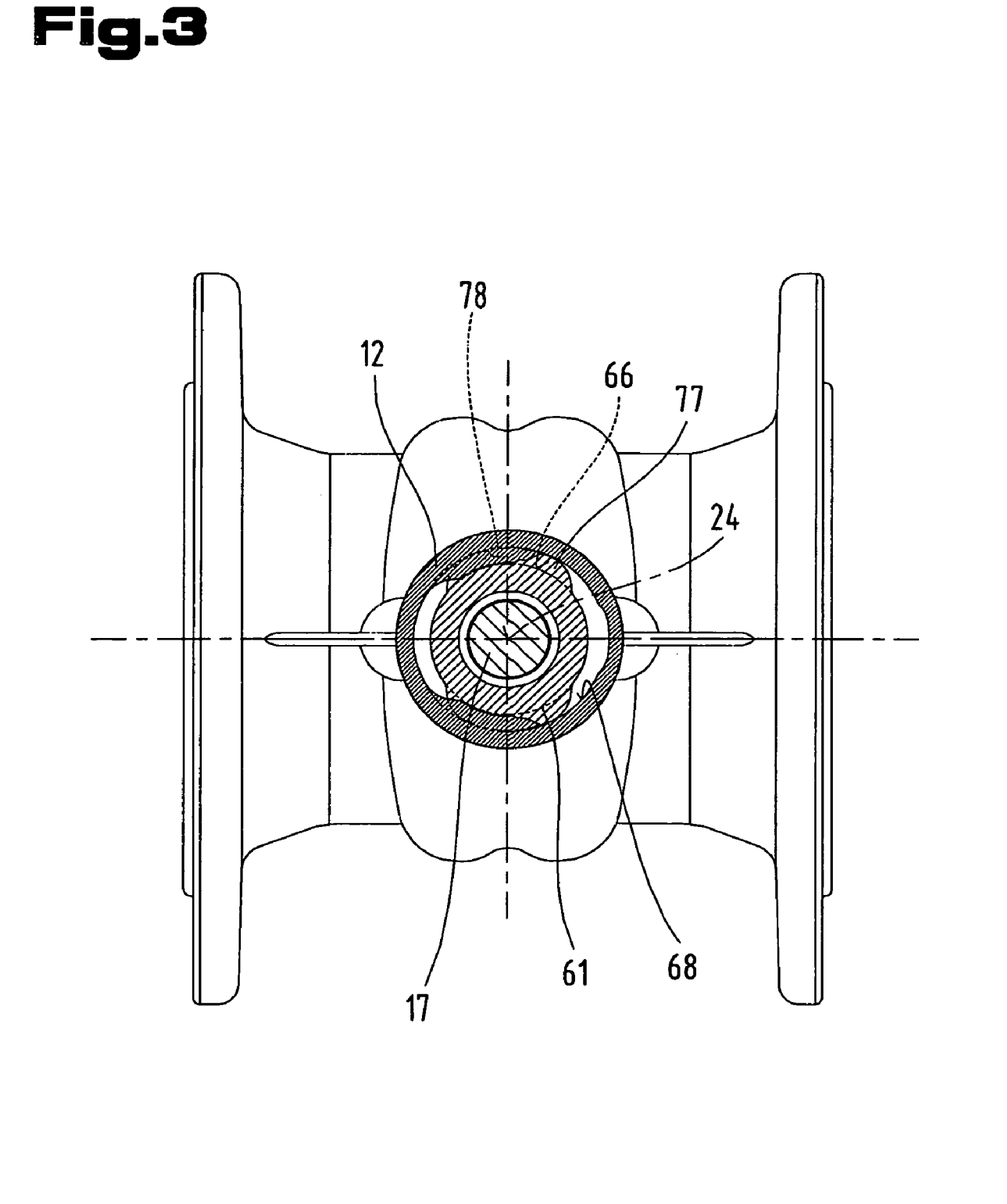
FIG. 3 shows the shut-off instrument, in cross section along the line III-III of FIG. 1.

A preferred design of the seal carrier 61 and the mount 68 is illustrated in FIG. 3. According to this design the seal carrier 61 comprises locking elements 77 which are diametrically opposite one another in relation to the longitudinal middle axis 24 and project beyond the external circumference 66. The mount 68 for the seal carrier 61 comprises mounting grooves 78 for mounting the locking elements 77 which face the latter in a locked position. The locking elements 77 and the mounting grooves 78 extend respectively over a quarter of the circular circumference of the external circumference 66 of the seal carrier 61 and the mount 68 in the housing neck extension 12. In this way a bayonet type of locking of the seal carrier 61 in the housing neck extension 12 is achieved and a position is reached at which the O-rings 65 of the seal arrangement 14 are preloaded due to the conicity of the mount 68.

The seal carrier 61 is shown in its locked position in the housing neck extension 12. In order to insert the seal carrier 61 during assembly or to remove it, e.g. for maintenance work, in particular when replacing the O-rings, the seal carrier is rotated from the shown position into a position pivoted about 90°, whereby the locking elements 77 are disengaged from the mounting grooves 78 and the seal carrier 61 can be removed from the mounting bores 67. The installation is performed in the opposite manner.

Figure 4:
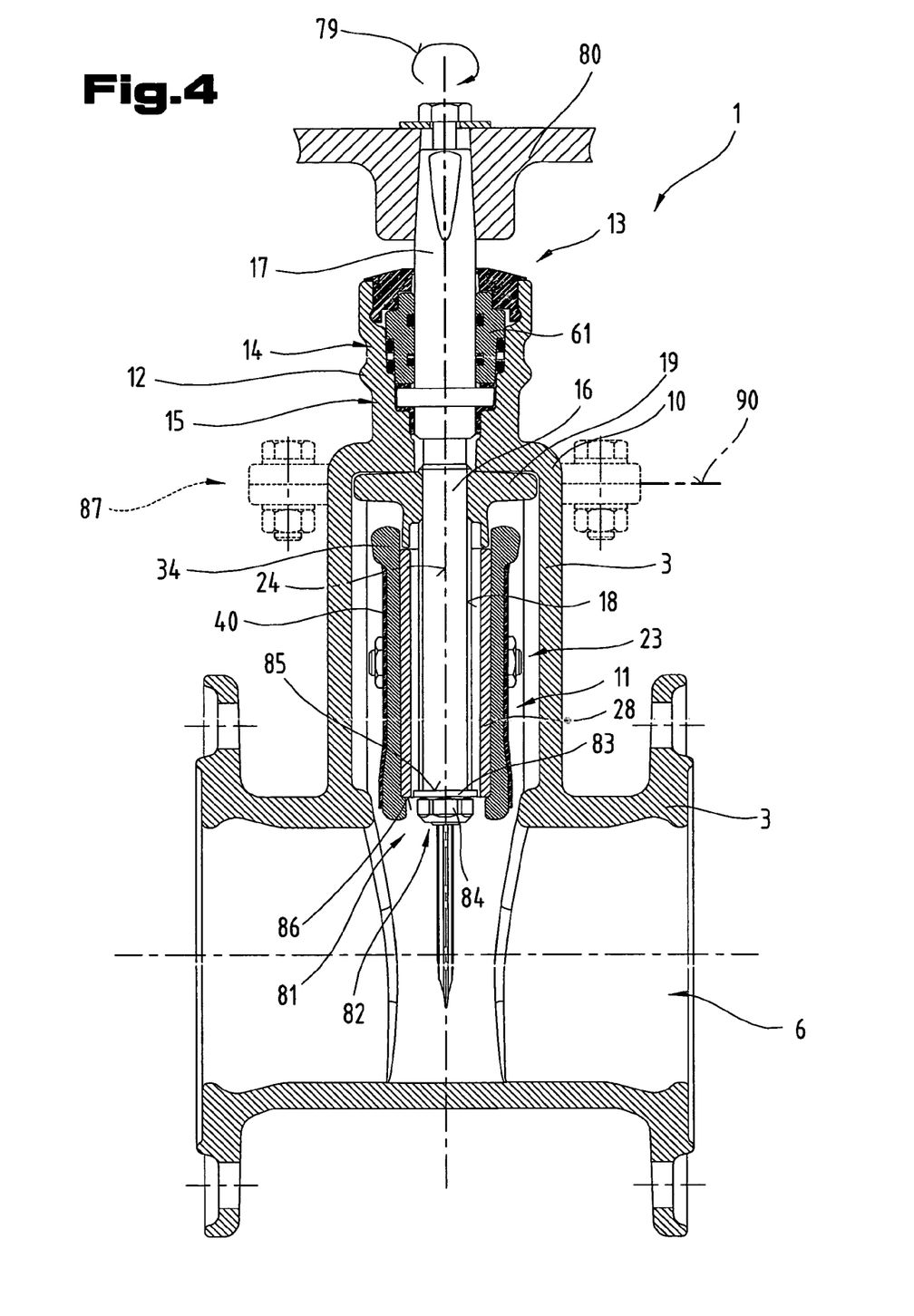
FIG. 4 shows the embodiment of the shut-off instrument of FIG. 1 in cross section with the shut-off element positioned completely inside the slide valve chamber and showing in dashed lines a variant of the instrument housing.

In FIG. 4 the shut-off instrument 1 is shown with the shut-off element 23 with an open flow channel 6, whereby the shut-off element 23 is positioned completely inside the slide valve chamber 11. In this case, the slide valve stem 16 in the region of the external thread 18 penetrates the main body 28 of the shut-off element 23 completely after a linear movement of the stem nut 19 according to arrow 79, when the slide valve stem 16 is opened at the stem projection 17. This kind of activation can be achieved manually by a hand wheel 80 engaging directly on the stem projection 17 but in the case of an automated shut-off instrument 1 by means of a motor drive, e.g. electric drive, compressed air drive etc.

In order to restrict the adjustment a stop arrangement 81 for example is provided between the slide valve stem 16 and the shut-off element 23, e.g. a detent disc 83 positioned at an end region 82 of the slide valve stem 16, said detent disc being fixed onto the slide valve stem 16 by means of a securing nut 84 and forming a stop plane 85 perpendicular to the longitudinal middle axis 24 for a lower side 86 of the main body 28. In this way a reliable end stop is obtained in the closed position of the shut-off element 23.

Furthermore, in FIG. 4 a possible variant of the design of the instrument housing 3 is shown by dashed lines. According to this variant the housing neck extension 12 forming the stem bushing 13 with the seal arrangement 14 and the bearing arrangement 15 is secured to the housing projection 10 forming the slide valve chamber 11 to obtain a multipart housing by means of a flange arrangement 87.

The design of the shut-off instrument 1 according to the invention makes it possible, with the option of using various different materials for the instrument housing 3, shut-off element 23 with main body 28, support discs 40, seal elements 34 as well as the slide valve stem 16 and the seal carrier 61, the seal arrangement 14 and the bearing arrangements 15, to use it for media for all kinds even highly aggressive media and from low pressures up to high pressures and for a broad temperature range, e.g. between minus 50° and plus 300° C.

The shut-off instrument 1 according to the invention is also characterised by the modular structure of the shut-off element 23, whereby the assembly and manufacture of the components is simplified, and there is an economic advantage as well as high manufacturing quality, which is particularly advantageous for serial production.

The simplification of assembly is achieved in that the components forming the shut-off element 23, such as the main body 28, sealing elements 34, support discs 40 and the required securing means 41 are fed through the flow channel 6 and can be assembled without expensive assembly aids. This also makes maintenance or servicing simple as it is possible to replace components in a straight forward manner.

Figure 5:
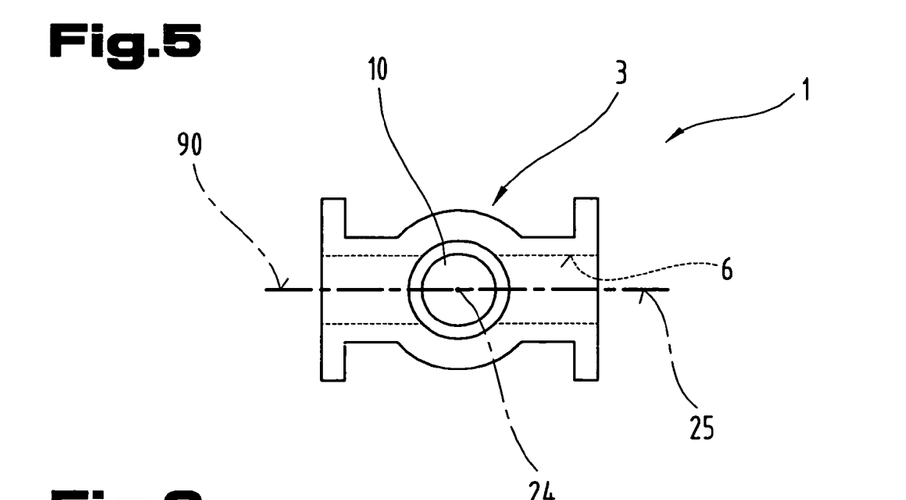
FIG. 5 shows the shut-off instrument according to the invention with a divided housing, in simplified view.
Figure 6:
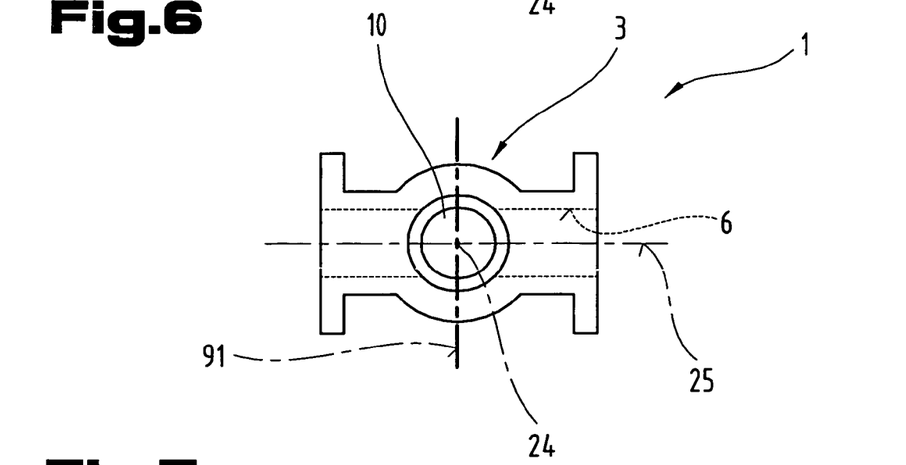
FIG. 6 shows a further design of a divided instrument housing in simplified view.
Figure 7:
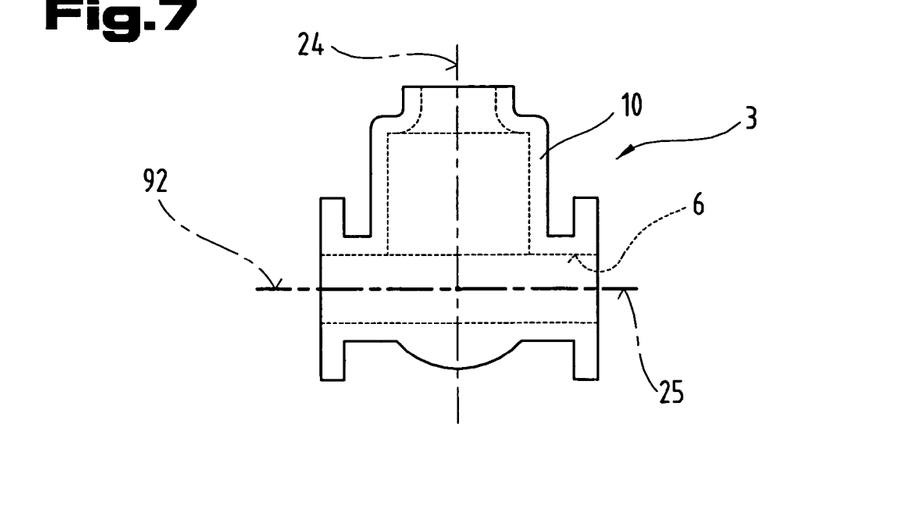
FIG. 7 shows a further design of a divided instrument housing in simplified view.

In FIGS. 5 to 7 division possibilities are shown in a simplified form for forming a multipart instrument housing 3. In order to connect the housing parts forming the instrument housing 3, to simplify the drawing methods know from the prior art, such as connecting flanges etc., are not shown.

In FIG. 6 a division of the instrument housing 3 is shown in a division plane 91, in which the longitudinal middle axis 24 of the housing projection 10 runs and is aligned perpendicular to the middle axis 25 of the flow channel 6.

In FIG. 5 in order to form a multipart shut-off element 3 a division is shown in a division plane 90, in which the longitudinal middle axis 24 of the housing projection 10 and the middle axis 25 of the flow channel 6 run together.

In FIG. 7 a division of the instrument housing 3 is shown, whereby the middle axis 25 of the flow channel 6 runs in this division plane 92 and is aligned perpendicular to the longitudinal middle axis 24 of the housing projection 10.

Figure 8:
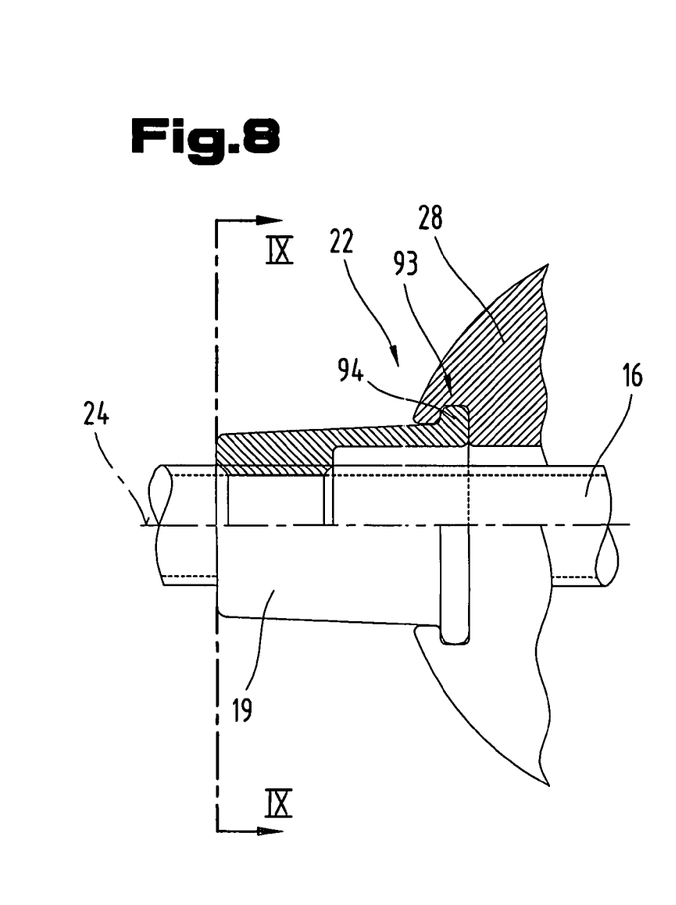
FIG. 8 shows a variant of a coupling arrangement in detail with the shut-off element and the stem nut, partially in cross section.
Figure 9:
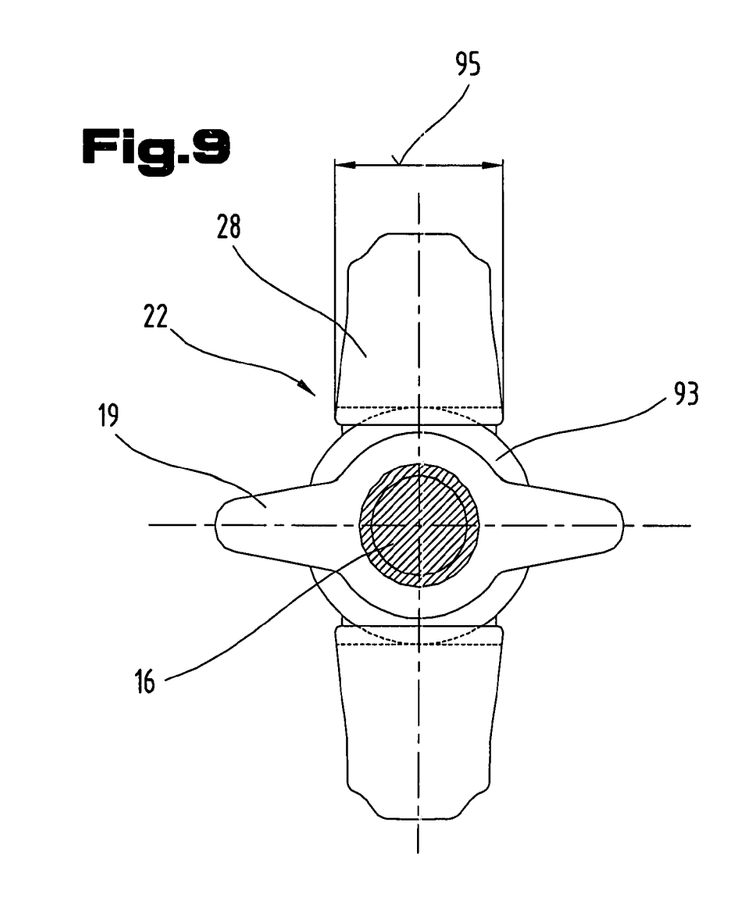
FIG. 9 shows the coupling arrangement in cross section along the line IX-IX of FIG. 8.

In FIGS. 8 and 9 a different design of the coupling arrangement 22 between the main body 28 and the stem nut 19 is shown. According to this design the stem nut 19 comprises a peripheral collar 94 at an end section 93 facing the main body 28. The main body 28 is provided with a coupling mount 96 running over the entire thickness 95, which by its design overlaps the collar 94 in parts, and thereby a moving connection is obtained between the stem nut 19 and the main body 28 for adjusting the main body 28 along the longitudinal middle axis 24 of the slide valve stem 16, without a torque being transmitted from the stem nut 19 to the main body 28.

Figure 10:
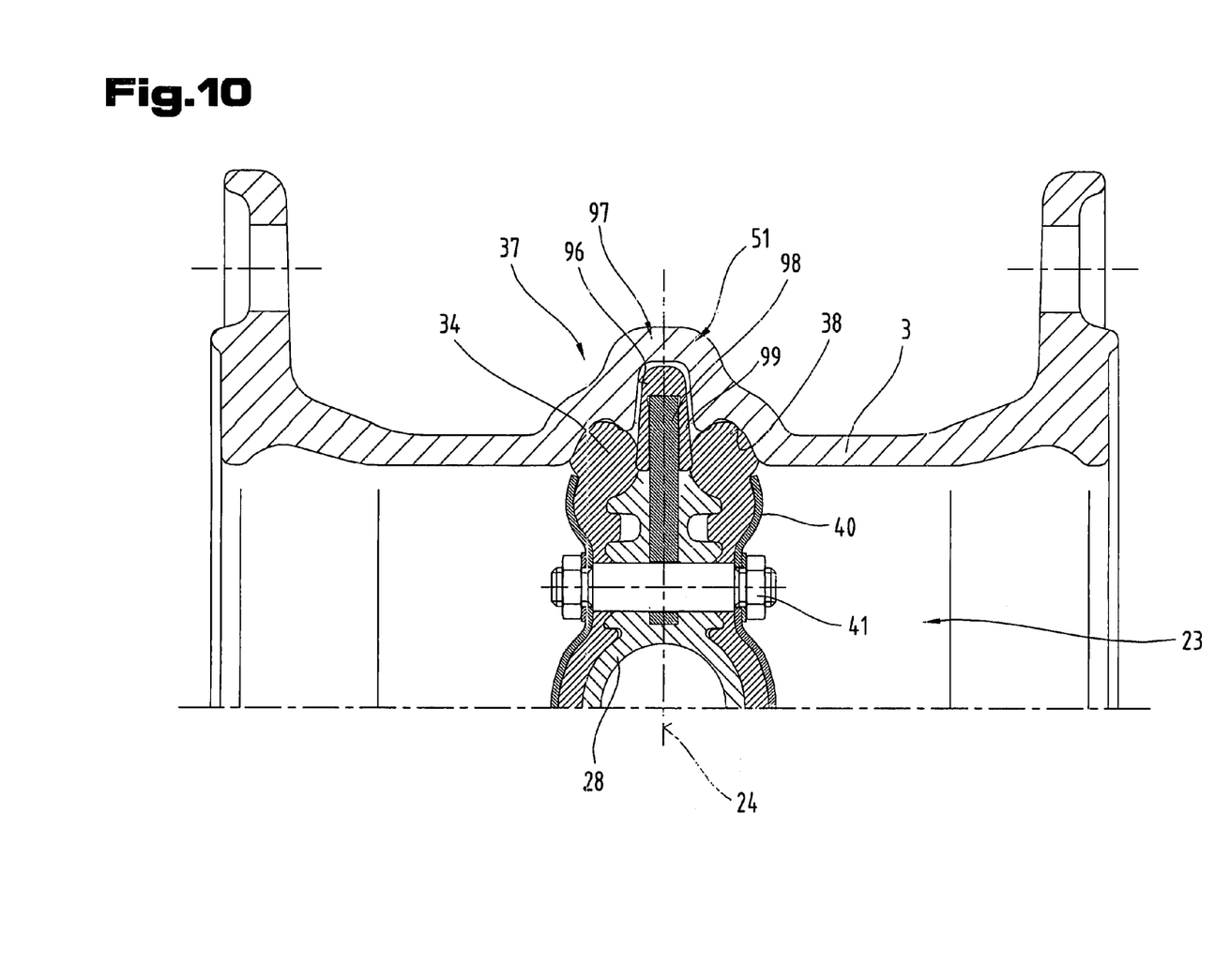
FIG. 10 shows a further design of the instrument housing with a guiding arrangement for the shut-off element in plan view of a housing half section.

In FIG. 10 a further embodiment of the guide arrangement 51 in the instrument housing 3 for the shut-off element 23 is shown, whereby in the illustration only a half section is shown. According to this design in the housing shaping 37 there are guide grooves 96 which run parallel and diametrically opposite the longitudinal middle axis 24, roughly in the middle between the sealing surfaces 38. In the main body 28 guide elements 97 are secured projecting over the latter laterally and reaching into the guide grooves 96. Preferably, the guide elements 97 are made from more than one piece and comprise a guide support element 98 also secured in the main body 28 by the securing means 41 for the seal elements 34 and support discs 40, which guide support element is for diverting the force, and also comprises a slide element 99 secured to the latter, e.g. made of a low friction material, in order to achieve a smooth adjustment of the shut-off element 23 in the guide arrangement 51.

Returning to FIG. 2 it should also be mentioned that a further advantageous design of the shut-off instrument 1 according to the invention is to divide the edge collars 35 of the seal elements 34 provided on the sealing surfaces 38 in the region of the housing shaping 37 for providing a seal by a groove running concentric to the external dimension 36 and thereby form sealing lips 100, 101, whereby a better sealing effect is achieved overall, but there is also the advantage that for the seal elements 34 a harder more resistant material with a correspondingly long lifetime can be used.

Figure 11:
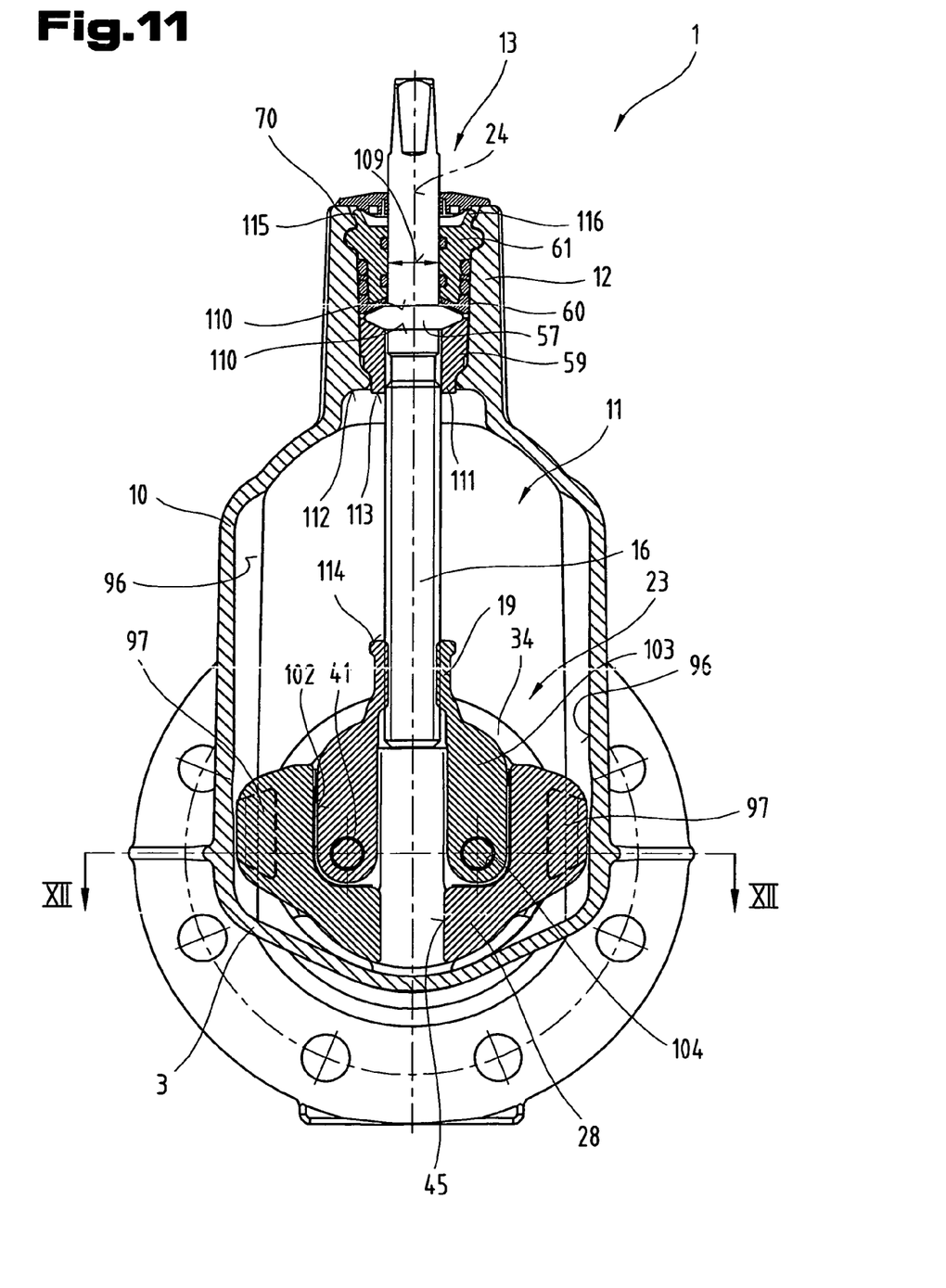
FIG. 11 shows a further design of the shut-off instrument according to the invention in cross section along the line XI-XI of FIG. 12.
Figure 12:
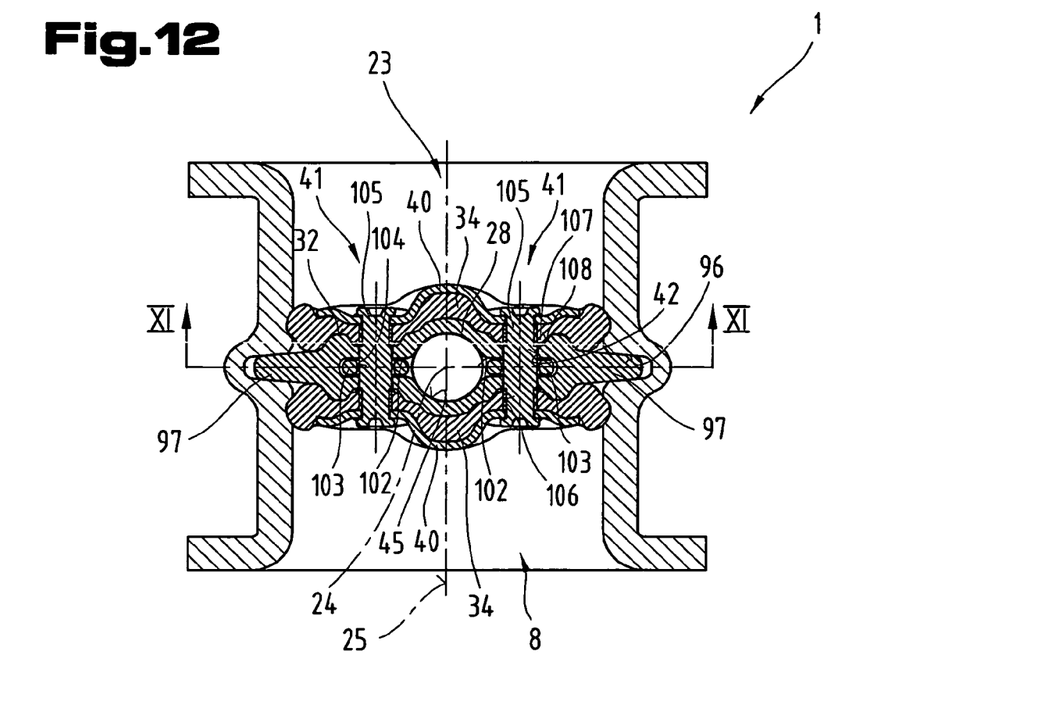
FIG. 12 shows the shut-off instrument in cross section along the line XII-XII of FIG. 11.

In FIGS. 11 and 12 a further design of the shut-off instrument 1 is shown. According to the embodiment shown in these figures the main body 28 of the shut-off element 23 is provided in one piece with the guide elements 94 with which the shut-off element 23 is guided linearly in guide grooves 96 arranged in the instrument housing 3 and in the housing projection 10. Furthermore the main body 28 has slot-like mounts 102 extending over the region of the securing means 41 from the mounting bore 45 for the slide valve stem 16 and symmetrically to the longitudinal middle axis 24. Securing tabs 103 connected in one piece with the stem nut 19 project into the latter, which are provided with bores 104, are connected by the securing means 41 to the main body 28 so as to be immobile. In this way a suitable connection and anchoring of the stem nut 19 to the shut-off element 23 is achieved for the assembly of the shut-off element 23 inside the instrument housing 3.

The embodiment shown also comprises rivet bolts 105 as connecting means 41 by means of which the components of the shut-off element 23, comprising the main body 28, the sealing elements 34 applied on both sides thereof, and the support discs 40 are permanently connected. Preferably, the seal elements 34 comprise bores 106 for inserting the sealing collars 107 comprising the rivet bolts 105 and facing the main body 28, which engage in compatibly matching mounts 108, which in the main body 28 contain the bore 42 for feeding through the rivet bolts 105, and produce a seal in the region of the bores 42 for the securing means.

As can also be taken from FIG. 11, in the region of the stem bushing 13 in the housing neck extension 12 the slide valve stem 16 is provided with the bearing collar 57, which in the embodiment shown is formed essentially from two annular surfaces 110 running towards one another at an angle to the longitudinal middle axis 24 in the form of truncated-cone sleeve surfaces and projecting over a stem diameter 109. The thereby roughly V-shaped guide cross section of the bearing flange 57 ensures, in connection with the bearing sleeve 59 arranged in the stem bushing 13 and the face seal ring 60, which are preferably made of a highly resistant plastic with low sliding friction for bearing purposes, a precise and long lasting bearing of the slide valve stem 16. The shaping of the bearing flange 57 together with the matching profiling of the bearing sleeve 59 and the face seal ring 60 produces a perfect radial and also axial bearing of the slide valve stem 16 in the region of the stem bushing 13.

The bearing sleeve 59 facing the shut-off element 23 projects with an annular extension 111 over a ring-shaped end face 112 facing the slide valve chamber 11 in the direction of the shut-off element 23 and thus forms a stop surface 113 for a ring-shaped end face 114 of the stem nut 19 facing the latter, whereby the movement of the shut-off element 23 into the open position, in which the flow cross section 8 is completely open, is restricted.

The seal carrier 61 inserted into the housing neck extension 12 by means of the bayonet lock, already described in the preceding Figures, comprises in the region of the end face 70 of the housing neck extension 12 at least two flanged noses 116 diametrically opposite the longitudinal middle axis 24 and engaging in notch recesses 115, by which the seal carrier 61 is secured against rotation in the bore 62 of the housing neck extension 11.

Figure 13:
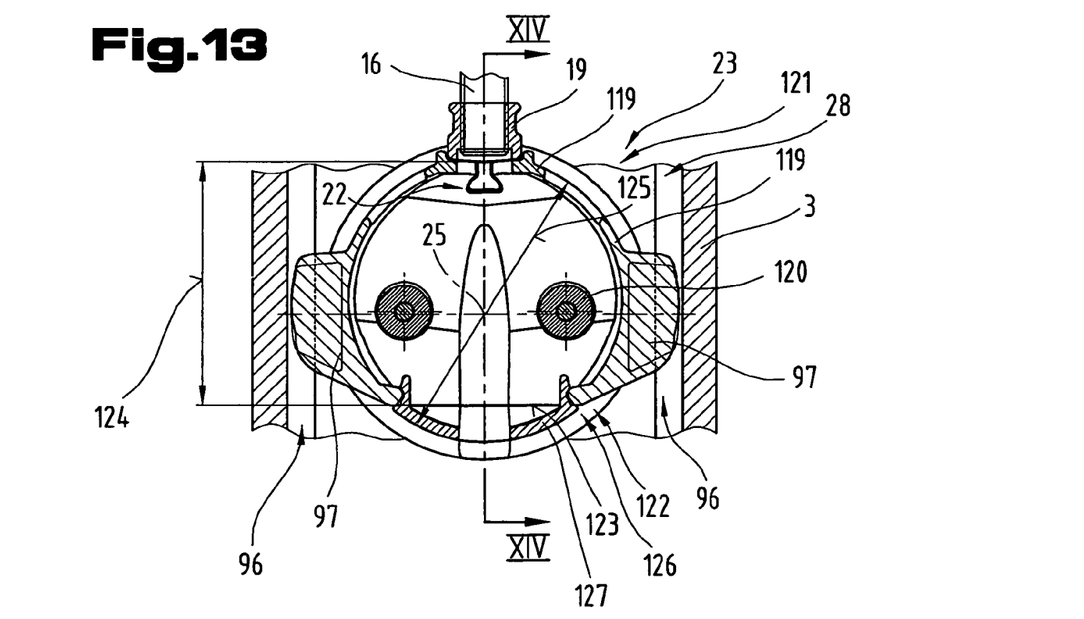
FIG. 13 shows a further design of the shut-off element according to the invention in cross section.
Figure 14:
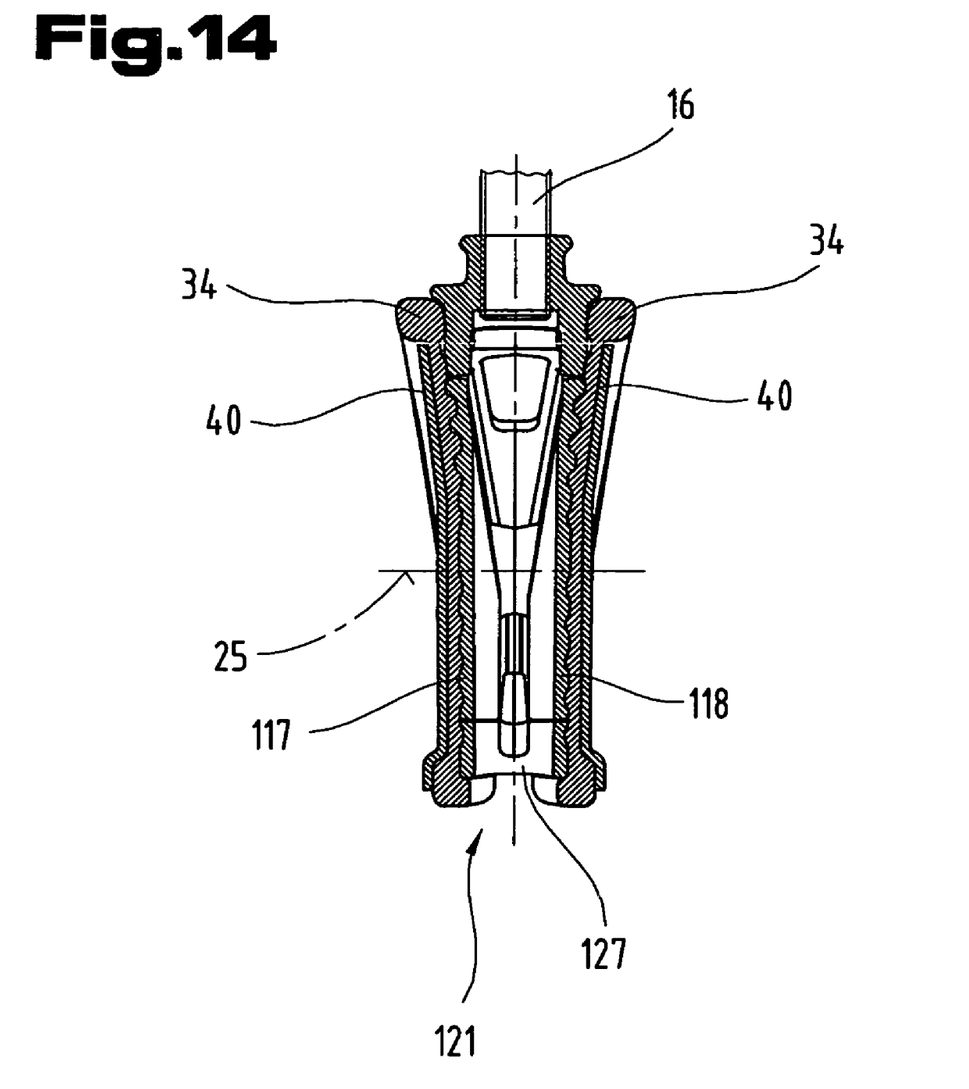
FIG. 14 shows a detail of the shut-off element in cross section along the line XIV-XIV of FIG. 13.

In FIGS. 13 and 14 a further design of the shut-off element 23 is shown in detail, in particular for shut-off instruments 1 with a greater nominal width, e.g. over 100 mm. In this design the main body 28 is formed essentially by two spaced apart, shaped wall discs 117, 118 for mounting the seal elements 34 and the support discs 40, whereby the wall discs 117, 118 form a hollow body 121 by means of wall sections 119 and spacing sleeves 120. Preferably, the wall discs 117, 118 together with the wall sections 119 and spacer sleeves 120 and the laterally projecting guide elements 97 form a one-piece component.

At an end section 122 opposite the coupling arrangement 22 between the stem nut 19 and the main body 28 the main body 28 is provided with a flattened section 123, whereby the height 124 is smaller than the diameter 125 of a theoretical circle outline of the outer contour of the main body 28.

By means of this flattened section 123 the insertion of the main body 28 into the instrument housing 3 and in particular the insertion of the guide elements 97 into the guide grooves 96 is made much easier during the assembly of the shut-off element 23 inside the instrument housing 3, whereby titling about the longitudinal axis 25 is necessary.

In order to ensure the required bearing and support for the seal elements 34 in the region of the main body 28 restricted by the flattened section 123, this section is installed before the assembly of the seal elements 34 and support discs 40, by means of a compensating element 127, completing the circular outline of the main body 28 which, can be coupled by a plug-and-socket connection 126 to the main body 28, in particular to the wall sections 119.

For form's sake it is pointed out that for a better understanding of the structure of the shut-off instrument 1 the latter and its components are not always drawn to scale and/or have been enlarged and/or reduced in size.

The objective forming the basis of the independent solutions of the invention can be taken from the description.

Mainly the individual designs shown in detail in FIGS. 1, 2, 3, 4; 5; 6; 7; 8, 9; 10; 11, 12; 13, 14 can form the subject matter of independent solutions according to the invention. The objectives and solutions relating thereto can be taken from the detailed descriptions of said figures.

| List of Reference Numbers | |
|---|---|
| 1 | Shut-off element |
| 2 | Slide valve instrument |
| 3 | Instrument housing |
| 4 | Connection element |
| 5 | Connection flange |
| 6 | Flow channel |
| 7 | Arrow |
| 8 | Flow cross section |
| 9 | Nominal diameter |
| 10 | Housing extension |
| 11 | Slide valve chamber |
| 12 | Housing neck extension |
| 13 | Stem bushing |
| 14 | Seal arrangement |
| 15 | Bearing arrangement |
| 16 | Slide valve stem |
| 17 | Stem projection |
| 18 | External thread |
| 19 | Stem nut |
| 20 | Bore |
| 21 | Internal thread |
| 22 | Coupling arrangement |
| 23 | Stop element |
| 24 | Longitudinal middle axis |
| 25 | Middle axis |
| 26 | Length |
| 27 | Structure height |
| 28 | Main body |
| 29 | External dimension |
| 30 | Coupling groove |
| 31 | Coupling means |
| 32 | Support surface |
| 33 | Rib |
| 34 | Seal element |
| 35 | Edge collar |
| 36 | External dimension |
| 37 | Housing shaping |
| 38 | Sealing surface |
| 39 | End face |
| 40 | Support disc |
| 41 | Securing means |
| 42 | Bore |
| 43 | Threaded bolt |
| 44 | Threaded nut |
| 45 | Mounting bore |
| 46 | Inner diameter |
| 47 | Thread external diameter |
| 48 | Distance |
| 49 | Guide web |
| 50 | Guide element |
| 51 | Guide arrangement |
| 52 | Width |
| 53 | Recess |
| 54 | Guide sheet |
| 55 | Double arrow |
| 56 | Guides |
| 57 | Bearing collar |

-continued

| List of Reference Numbers | |
|---|---|
| 58 | Bearing flange |
| 59 | Bearing sleeve |
| 60 | Face seal ring |
| 61 | Seal carrier |
| 62 | Bore |
| 63 | Grooves |
| 64 | O-ring |
| 65 | O-ring |
| 66 | External circumference |
| 67 | Mounting bore |
| 68 | Surface |
| 69 | Bearing bore |
| 70 | End face |
| 71 | Recess |
| 72 | Support surface |
| 73 | Neck ring |
| 74 | Locking arrangement |
| 75 | Spring arms |
| 76 | Locking mount |
| 77 | Locking element |
| 78 | Mounting grooves |
| 79 | Arrow |
| 80 | Hand wheel |
| 81 | Stop arrangement |
| 82 | End section |
| 83 | Detent ring |
| 84 | Securing nut |
| 85 | Stop plane |
| 86 | Lower side |
| 87 | Flange arrangement |
| 88 | |
| 89 | |
| 90 | Division plane |
| 91 | Division plane |
| 92 | Division plane |
| 93 | End section |
| 94 | Collar |
| 95 | Thickness |
| 96 | Guide groove |
| 97 | Guide element |
| 98 | Guide support element |
| 99 | Slide element |
| 100 | Sealing lip |
| 101 | Sealing lip |
| 102 | Mount |
| 103 | Securing tab |
| 104 | Bore |
| 105 | Groove bolt |
| 106 | Bore |
| 107 | Sealing collar |
| 108 | Mount |
| 109 | Stem diameter |
| 110 | Annular surface |
| 111 | Annular extension |
| 112 | End face |
| 113 | Stop surface |
| 114 | End face |
| 115 | Notch recess |
| 116 | Flanged nose |
| 117 | Wall disc |
| 118 | Wall disc |
| 119 | Wall section |
| 120 | Spacer sleeves |
| 121 | Hollow body |
| 122 | End section |
| 123 | Flattened section |
| 124 | Height |
| 125 | Diameter |
| 126 | Part connection |
| 127 | Compensating element |

The invention claimed is:

1. Shut-off instrument (1) for a flow medium, pressurized on both sides with an instrument housing (3) forming a flow channel (6) and a slide valve chamber (11) and with a soft sealing, multipart shut-off element (23) for sealing the flow channel (6), and with a slide stem (16) which penetrates a seal arrangement (14) and/or bearing arrangement (15) in a housing neck extension (12) delimiting the slide valve chamber (11) and which is rotationally connected to a stem nut (19) coupled to the shut-off element (23) by means of threaded engagement, and with a main body (28) provided with sealing elements (34), said main body (28) having at least one external dimension (29) that is slightly smaller than a nominal width (9) of the flow channel (6), wherein on opposite support surfaces (32) of the main body (28) ribs (33) projecting over its surfaces are arranged to form a matching structure for the engaged arrangement of the sealing elements (34), and the sealing elements (34) on the main body (28) are secured by support discs (40) arranged on opposite end faces (39) of the seal elements (34) by means of securing means (41) traversing the support discs (40), seal elements (34) and the main body (28) in bores (42).

2. Shut-off instrument according to claim 1, wherein in the housing neck extension (12) sealing surfaces (38) are arranged which mount the sealing and/or bearing arrangement (14, 15) and are concentric to a longitudinal middle axis (24) of the slide valve stem (16), which seal surfaces widen conically from a base of the housing neck extension (12) in the direction of an end face (70) of the housing neck extension (12).

3. Shut-off instrument according to claim 1, wherein the instrument housing (3) is in one piece with the housing neck extension (12).

4. Shut-off instrument according to claim 2, wherein the instrument housing (3) comprises multiple parts with the housing neck extension (12).

5. Shut-off instrument according to claim 2, wherein the instrument housing (3) is divided in the region of the slide valve chamber (11) in a plane running perpendicular to the longitudinal middle axis (24) of the slide valve stem (16).

6. Shut-off instrument according to claim 4, wherein the instrument housing (3) is divided in a division plane (90) following the longitudinal middle axis (24) of the slide valve stem (16) and a middle axis (25) of the flow channel (6).

7. Shut-off instrument according to claim 4, wherein the instrument housing (3) is divided in a division plane (91) following the longitudinal middle axis (24) and running perpendicular to the middle axis (25).

8. Shut-off instrument according to claim 4, wherein the instrument housing (3) is divided in a division plane (92) following the middle axis (25) and running perpendicular to the longitudinal middle axis (24).

9. Shut-off instrument according to claim 1, wherein the housing parts of the instrument housing (3) are detachably connected by a flange arrangement (87) formed in a region of a division plane (90, 91, 92).

10. Shut-off instrument according to claim 2, wherein in the slide valve chamber (11) guides (56) running parallel to the longitudinal middle axis (24) are arranged for preventing the twisting of the stem nut (19).

11. Shut-off instrument according to claim 10, wherein the guides (56) comprise depressions in the slide valve chamber (11) of the instrument housing (3) that are diametrically opposite one another in relation to the longitudinal middle axis and groove-shaped.

12. Shut-off instrument according to claim 10, wherein the guides (56) are in the form of guide strips in the slide valve chamber (11) of the instrument housing (3) that are diametrically opposite one another in relation to the longitudinal middle axis (24).

13. Shut-off instrument according to claim 2, wherein the stem nut (19) is mounted so as to be secure against twisting by means of guide extensions in the groove or strip-like guides (56) that are diametrically opposite one another in relation to the longitudinal middle axis (24).

14. Shut-off instrument according to claim 2, wherein the stem nut (19) is provided with coupling means (31) which lie diametrically opposite to the longitudinal middle axis (24) and engage in coupling grooves (30) of the main body (28).

15. Shut-off instrument according to claim 1, wherein at an end position of the stem nut (19) corresponding to the shut position the coupling means (31) project over the slide valve chamber (11) in the direction of the flow channel (6).

16. Shut-off instrument according to claim 1, wherein the main body (28) is in the shape of a disc and in the direction of an external dimension (29) is penetrated by a mounting bore (45) receiving the slide valve stem (16).

17. Shut-off instrument according to claim 1, wherein the main body (28) is in the form of a hollow body (121) or wall discs (117, 118) connected by wall sections (119) and spacer sleeves (120).

18. Shut-off instrument according to claim 2, wherein the main body is provided with at least one flattened section (123) which lies in a plane running perpendicular to the longitudinal middle axis (24).

19. Shut off instrument according to claim 18, wherein in the region of the at least one flattened section (123) in the main body (28) a compensating element (127) is arranged which is secured via a plug and socket connection (126).

20. Shut off instrument according to claim 2, wherein the main body (28) is secured against twisting in a guide arrangement (51) extending linearly to an adjustment direction in the instrument housing (3).

21. Shut-off instrument according to claim 2, wherein the guide arrangement (51) is formed by guide elements (50, 97) laterally projecting over an external outline of the main body (28) and guide webs (49) in the instrument housing (3) which run parallel to the longitudinal middle axis (24) and are diametrically opposite one another.

22. Shut-off instrument according to claim 21, wherein the guide webs (49) are arranged in the region of housing shapings (37) outside a flow cross section (8) of the flow channel (9).

23. Shut-off instrument according to claim 20, wherein the guide arrangement (51) is formed in the instrument housing (3) for the guide elements (50, 97) projecting laterally over the main body (28) by guide webs (49) or guide grooves (96) running parallel to the longitudinal middle axis (24) and diametrically opposite one another.

24. Shut-off instrument according to claim 23, wherein the guide elements (50, 97) cooperating with the guide webs (49) or guide grooves (96) are secured in the main body (28).

25. Shut-off instrument according to claim 21, wherein the guide elements (50, 97) are connected in one piece with the main body (28).

26. Shut-off instrument according to claim 2, wherein the seal elements (34) are connected with the support discs (40) and the guide elements (50) by securing means (41), arranged in a main body middle plane running perpendicular to the longitudinal middle axis (24).

27. Shut-off instrument according to claim 1, wherein the seal elements (34) are penetrated by the securing means (41) in bores (42), whereby the bores (42) are pressure-tight with the securing means (41).

28. Shut-off instrument according to claim 1, wherein a sealing collar (107) surrounding the bore (42) is arranged on the sealing element (34).

29. Shut-off instrument according to claim 28, wherein in order to mount the sealing collar (107) in the main body (28) a mount (108) encompassing the bore (42) is arranged for the sealing collar (107).

30. Shut-off instrument according to claim 1, wherein the sealing arrangement (14) for the slide valve stem (16) in the housing neck extension (12) comprises a seal carrier (61) comprising an inner and outer seal, and surrounding a stem projection (17).

31. Shut-off instrument according to claim 30, wherein the inner and outer seal is in the form of a pairwise arrangement of O-rings (64, 65).

32. Shut-off instrument according to claim 30, wherein the seal carrier (61) is positioned in the housing neck extension (12) by means of a bayonet-locking device.

33. Shut-off instrument according to claim 30, wherein an extension of the seal carrier (61) mounting the external seal projection forms a conical seal projection.

34. Shut-off instrument according to claim 30, wherein the bayonet locking device of the seal carrier (61) in the housing neck extension (12) is formed by locking elements (77) projecting diametrically over an external diameter of the seal carrier (61) and mounting grooves (78) allocated to the locking elements (77) in a mounting bore (67) of the housing neck extension (12).

35. Shut-off instrument according to claim 30, wherein the seal carrier (61) in the housing neck extension (12) is prevented from twisting by at least one flanged nose (116).

36. Shut-off instrument according to claim 34, wherein in the housing neck extension (12) a bearing arrangement (15) is provided for the rotatable bearing of the slide valve stem (16).

37. Shut-off instrument according to claim 36, wherein the slide valve stem (16) has a bearing flange (57) in the region of the bearing arrangement (15).

38. Shut-off instrument according to claim 37, wherein the bearing flange (57) is formed by a annular collar with a triangular cross section projecting over a stem diameter (109).

39. Shut-off instrument according to claim 36, wherein in the mounting bore (67) of the housing neck extension (12) for the stem bushing (13) a bearing sleeve (59) is arranged, provided with a bearing flange (58) for mounting the bearing flange (57).

40. Shut-off instrument according to claim 30, wherein a face seal ring (60) is arranged between the bearing collar (57) and the seal carrier (61).

41. Shut-off instrument according to claim 36, wherein bearing means of the bearing arrangement (15) for the slide valve stem (16) are formed by a bearing layer applied to bearing points in the housing neck extension (12).

42. Shut-off instrument according to claim 30, wherein at the end section of the housing neck extension (12) enclosing the stem projection (17) a neck ring (73) is arranged which is secured in the housing neck extension (12) and penetrated by the stem projection (17).

43. Shut-off instrument according to claim 1, wherein the main body (28) of the shut-off element (23) is made of metal, plastic or high-temperature resistant materials and/or materials that are resistant to aggressive media.

44. Shut-off instrument according to claim 1, wherein the seal element (34) is made of elastomers, plastic or high-temperature resistant materials and/or materials that are resistant to aggressive media.

45. Shut-off instrument according to claim 1, wherein the support ring (40) is made of metal, plastic or high-temperature resistant materials and/or materials that are resistant to aggressive media.

46. Shut-off instrument according to claim 1, wherein the stem nut (19) is made of metal, plastic or high-temperature resistant materials and/or materials that are resistant to aggressive media.

47. Shut-off instrument according to claim 30, wherein the slide valve stem (16) is made of metal, plastic or high-temperature resistant materials and/or materials that are resistant to aggressive media.

48. Shut-off instrument according to claim 30, wherein the seal carrier (61) is made of metal, plastic or high-temperature resistant materials and/or materials that are resistant to aggressive media.

49. Shut-off instrument according to claim 1, wherein the instrument housing (3) is made of metal, plastic or high-temperature resistant materials and/or materials that are resistant to aggressive media.

50. Shut-off instrument according to claim 1, wherein the locking position of the shut-off element (23), in which the seal elements (34) lie against the sealing surfaces (38) of the instrument housing (3), is formed by a stop arrangement (81) between the slide valve stem (16) and the main body (28) of the shut-off element (23), in particular by a detent ring (83) secured to the end section of the slide valve stem (16), which delimits the movement of the threaded stem (16).

51. Shut-off instrument according to claim 1, wherein the edge collar (35) of the sealing element (34) has sealing lips (100, 101).

* * * * *